United States Patent
Williams et al.

(10) Patent No.: US 10,253,625 B2
(45) Date of Patent: Apr. 9, 2019

(54) AUTOMATED SYSTEM PRE-CHECK METHODOLOGY AND CORRESPONDING INTERFACE

(71) Applicant: HALLIBURTON ENERGY SERVICES, INC., Houston, TX (US)

(72) Inventors: Derek Ray Williams, Duncan, OK (US); Charles Edward Neal, III, Duncan, OK (US); James Douglas Funkhouser, Duncan, OK (US); Chip Imel, Edmond, OK (US); Gary Lee Cline, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/747,048

(22) PCT Filed: Sep. 2, 2015

(86) PCT No.: PCT/US2015/048138
§ 371 (c)(1),
(2) Date: Jan. 23, 2018

(87) PCT Pub. No.: WO2017/039653
PCT Pub. Date: Mar. 9, 2017

(65) Prior Publication Data
US 2018/0363459 A1 Dec. 20, 2018

(51) Int. Cl.
*E21B 49/08* (2006.01)
*E21B 33/13* (2006.01)
*E21B 43/12* (2006.01)
*E21B 47/00* (2012.01)
*G06F 3/0482* (2013.01)

(52) U.S. Cl.
CPC .............. *E21B 49/08* (2013.01); *E21B 33/13* (2013.01); *E21B 43/12* (2013.01); *E21B 47/0005* (2013.01); *G06F 3/0482* (2013.01)

(58) Field of Classification Search
CPC ...... B28C 7/0418; B28C 9/0454; E21B 49/08
See application file for complete search history.

(56) References Cited

U.S. PATENT DOCUMENTS 4,259,868 A * 4/1981 Rao .................... G01N 29/07
73/597
4,432,064 A 2/1984 Barker et al.
(Continued)

FOREIGN PATENT DOCUMENTS

EP 0637783 A1 2/1995

OTHER PUBLICATIONS

Cementing, The HCR Elite® Cementing Unit, The Industry's Only Automatic Density Control® Mixing System with Twin HT-400™ Pumps for a Combined 1,025 Trailer Horsepower, H02669, Feb. 2008, 2 pages, Halliburton, Houston, TX.
(Continued)

*Primary Examiner* — Elias Desta
(74) *Attorney, Agent, or Firm* — Polsinelli PC

(57) ABSTRACT

A cementing system is provided. A cement slurry dispenser includes at least one control valve, at least one liquid additive pump, and at least one water pump. A computer has a display for an interface screen. The e interface screen displays a list zone of available selectable tests for the cement slurry dispenser and corresponding global selection choices, a detail zone, wherein in response to selection of one of the selectable tests from the list zone, substeps of the selected one of the selectable tests is displayed a local activate button configured to commence only the selected one of the selectable tests displayed in the detail zone; and a global activate button configured to commence all of the selectable tests in the list zone that are indicated as selected by the corresponding global selection choices. The computer implements the tests on the cement slurry dispenser.

14 Claims, 12 Drawing Sheets

(56) References Cited

U.S. PATENT DOCUMENTS

| | | | |
|---|---|---|---|
| 5,289,877 | A | 3/1994 | Naegele et al. |
| 5,320,425 | A | 6/1994 | Stephenson et al. |
| 5,571,281 | A | 11/1996 | Allen |
| 7,660,648 | B2 | 2/2010 | Dykstra |
| 2003/0200015 | A1 | 10/2003 | Pillar |
| 2007/0137285 | A1* | 6/2007 | Jennings ............... G01F 22/00 73/53.01 |
| 2008/0165612 | A1 | 7/2008 | Dykstra |
| 2013/0324444 | A1* | 12/2013 | Lesko ..................... C09K 8/42 507/206 |
| 2016/0250607 | A1* | 9/2016 | Easton ............... B01F 7/00558 106/638 |

OTHER PUBLICATIONS

Junger, Markus, Vector, Introduction to J1939, Version 1.1, Application Note AN-ION-1-3100, Apr. 27, 2010, Vector Informatik GmbH, Stuttgart, DE.

Axiomatic Global Electronic Solutions, Q&A—What is SAE J1939?, A.M.—Application Note, Jul. 6, 2006, Axiomatic Technologies Corporation, Canada.

International Search Report and Written Opinion; PCT Application No. PCT/US2015/048138; dated May 18, 2016.

Search Report; French Application No. 1657477; dated Jan. 29, 2018.

\* cited by examiner

AUTOMATED SYSTEM PRE-CHECK METHODOLOGY AND CORRESPONDING INTERFACE

CROSS-REFERENCE TO RELATED APPLICATIONS

This application is a national stage entry of PCT/US2015/048138 filed Sep. 2, 2015, said application is expressly incorporated herein in its entirety.

TECHNICAL FIELD

The various embodiments described herein relate generally to a pre-check methodology and corresponding system interface for confirming system operation before use of the system. More specifically, various embodiments described herein relate to a cement or fluid composition dispensing system with certain pre-check diagnostic testing capabilities and corresponding interfaces to confirm operations of different parts of the cement or fluid composition dispensing system before the cement or fluid composition is dispensed.

BACKGROUND

Cement slurry or fluid composition dispensers have a variety of components, such as valves and pumps. Diagnostic testing of such valves and pumps is done manually, which is time consuming and generates minimal useful data.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Disclosed herein is one or more graphical user interfaces (GUIs) for monitoring, controlling, or quality testing the functions of the individual components of a cementing system described above. The GUI(s) disclosed herein can display one or more monitoring and controlling options of a single component or multiple components of the cementing system. The GUI's can improve control and efficiency of the cementing process.

Figure 1:
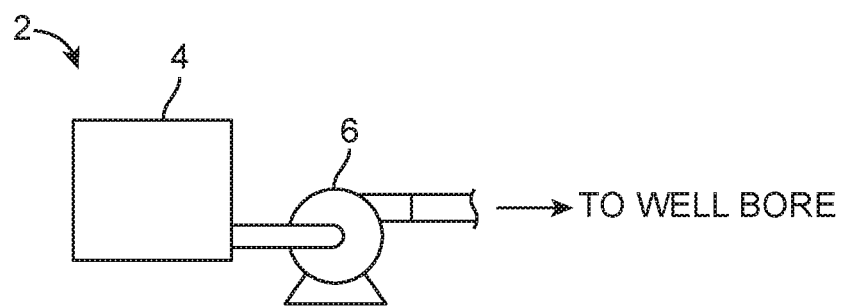
FIG. 1 illustrates a system for preparation and delivery of a cement composition to a well bore in accordance with aspects of the present disclosure.

Referring now to FIG. 1, an exemplary cementing system in which the GUI's can be implemented will now be described. FIG. 1 illustrates a system 2 for preparation of a cement or fluid composition and delivery to a well bore in accordance with certain embodiments. As shown, the cement or fluid composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2A:
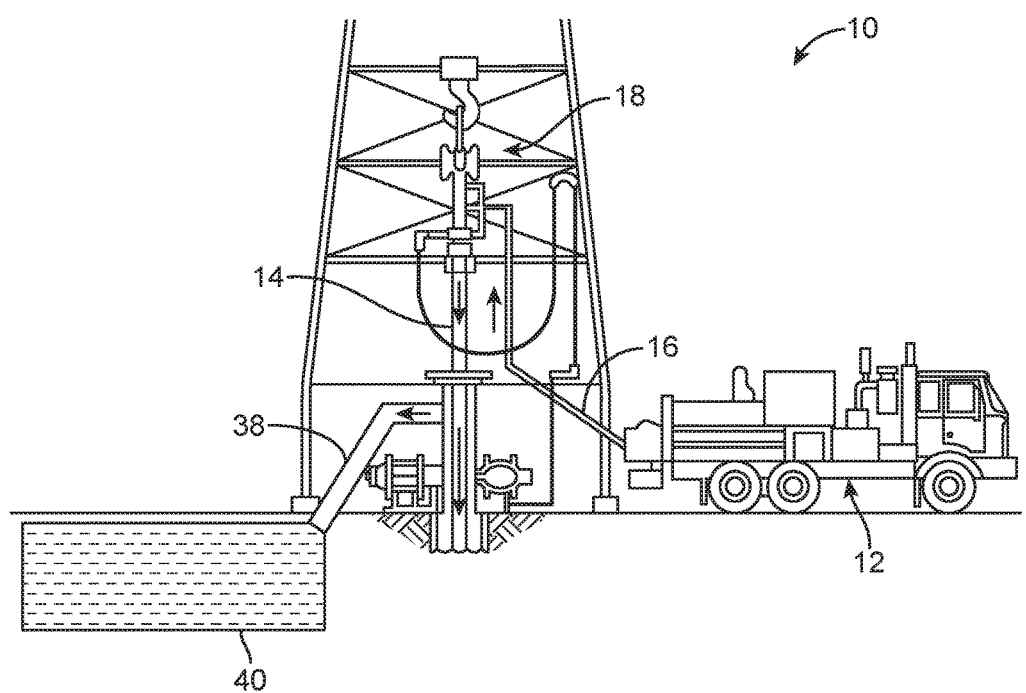
FIG. 2A illustrates surface equipment that may be used in placement of a cement composition in a well bore in accordance with aspects of the present disclosure.

An example technique and system for placing a cement or fluid composition into a subterranean formation will now be described with reference to FIGS. 2A and 2B. FIG. 2A illustrates surface equipment 10 that may be used in placement of a cement or fluid composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks as shown in FIG. 2A, or a skid (discussed with respect to FIG. 3 below). The cementing unit 12 may include mixing equipment 4 and pumping equipment 6 (e.g., FIG. 1) as will be apparent to those of ordinary skill in the art. The cementing unit 12 may pump a cement or fluid composition 14 through a feed pipe 16 and to a cementing head 18 which conveys the cement or fluid composition 14 downhole.

The cementing unit 12, whether in the form of trucks, or a skid (discussed with respect to FIG. 3 below), can include a programmable logic controller (PLC) computer internal or external the cementing unit 12 or otherwise coupled with the surface equipment 10. The PLC computer can include the GUIs disclosed herein and discussed in more detail below.

Figure 2B:
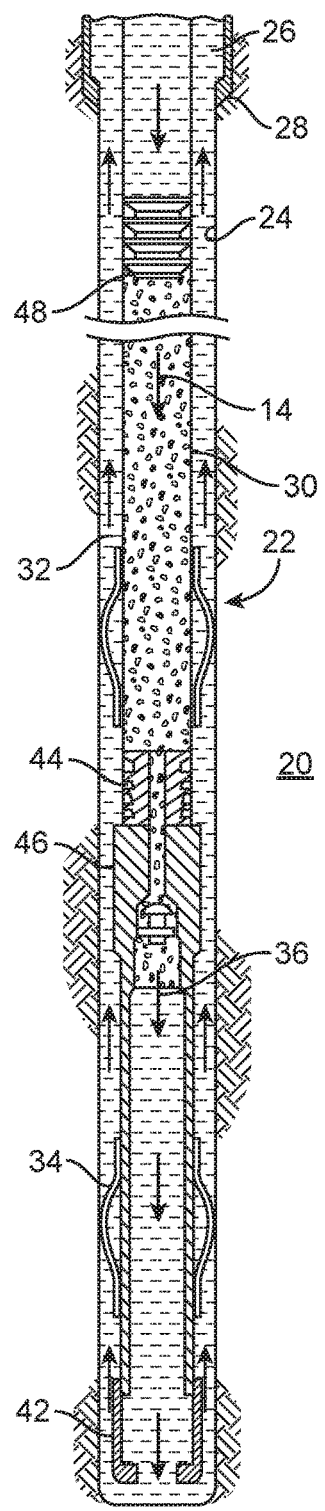
FIG. 2B illustrates placement of a cement composition into a well bore annulus in accordance with aspects of the present disclosure.

Turning now to FIG. 2B, the cement or fluid composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement or fluid composition 14 may be pumped down the interior of the casing 30. The cement or fluid composition 14 may be allowed to flow down the interior of the casing 30 through the casing shoe 42 at the bottom of the casing 30 and up around the casing 30 into the well bore annulus 32. The cement or fluid composition 14 may be allowed to set in the well bore annulus 32, for example, to form a cement sheath that supports and positions the casing 30 in the well bore 22. While not illustrated, other techniques may also be utilized for introduction of the cement or fluid composition 14. By way of example, reverse circulation techniques may be used that include introducing the cement or fluid composition 14 into the subterranean formation 20 by way of the well bore annulus 32 instead of through the casing 30.

As it is introduced, the cement or fluid composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the cement or fluid composition 14, for example, to separate the cement or fluid composition 14 from the fluids 36 that may be inside the casing 30 prior to injection. After the bottom plug 44 reaches the landing collar 46, a diaphragm or other suitable device ruptures to allow the cement or fluid composition 14 through the bottom plug 44. In FIG. 2B, the bottom plug 44 is shown on the landing collar 46. In the illustrated embodiment, a top plug 48 may be introduced into the well bore 22 behind the cement or fluid composition 14. The top plug 48 may separate the cement or fluid composition 14 from a displacement fluid 50 and also push the cement or fluid composition 14 through the bottom plug 44.

Figure 3:
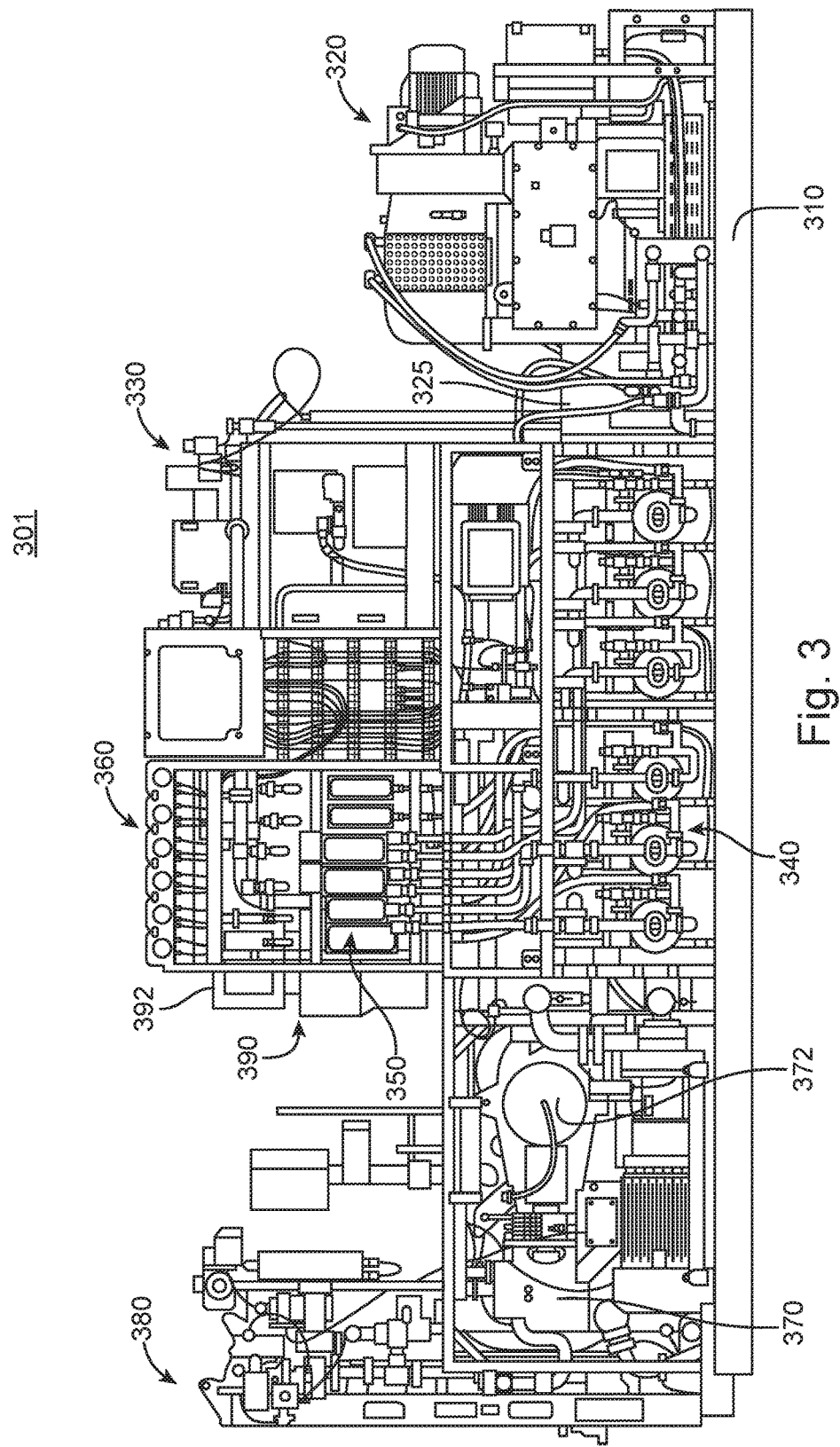
FIG. 3 is a side view of an embodiment of a skid-mounted cementing system for dispensing cement or a fluid composition.

Referring now to FIG. 3, a non-limiting example of cementing equipment 12 is shown as cementing system 301. The cementing system 301 can be coupled to an oil or hydrocarbon producing rig and configured to inject a fluid, such as a cement slurry or fluid composition, into a wellbore at variable degrees of pressure. Components of the cementing system 301, as described below, can be coupled to a skid 310. The skid 310 can be permanently or temporarily immobilized on the surface of the rig. In the exemplary embodiment, the skid-mounted cementing system 301 is used in off-shore oil production operations and is therefore required to be permanently or temporarily immobilized on the surface of the rig. Alternatively, the skid-mounted cementing system 301 can be used in land-based oil production operations. In land-based operations, the skid-mounted cementing system 301 can be permanently or temporarily immobilized on the surface of the rig, or adjacent or in substantially close proximity to the rig on a ground surface. The skid 310 can be one continuous piece of suitable weight bearing material, such as for example, steel. Alternatively the skid 310 can be made up of a plurality of couplable sections. When the skid 310 is made up a plurality of couplable sections, each section can correspond to an individual component of the cementing system 301. The couplable sections, each with a component of the cementing system coupled thereto, and components of the cementing system 301 can be assembled on-site or during manufacturing of the cementing system 301.

The cementing system 301 includes an power source 320, a fluid mixing system 330, a plurality of liquid additive pumps 340, a plurality of flow meters 350, a plurality of data transmitters 360, a high pressure fluid pump system 370, a high pressure discharge manifold 380, and a programmable logic control (PLC) computer 390.

Figure 9:
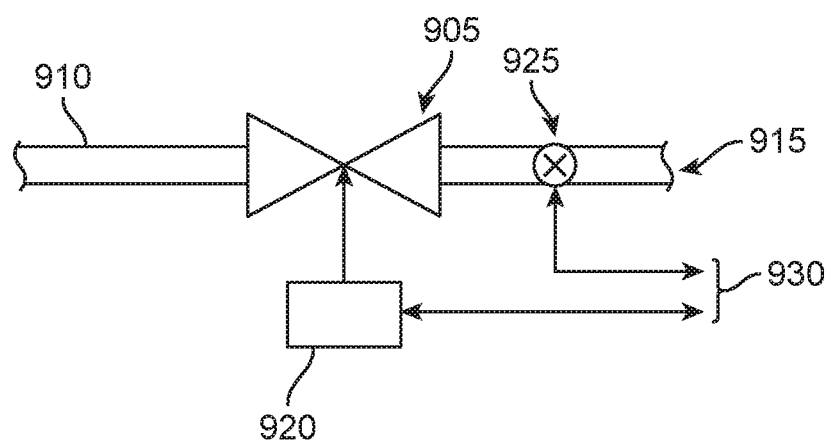
FIG. 9 is a conceptual drawing of a valve with control and monitoring components subject to diagnostic testing according to an embodiment.

Generally in the area behind 350 and 360 (but not shown), are several main control values 905, illustrated and discussed with reference to FIG. 9 below, which include a cement control valve that controls the flow of dry cement, a water control valve that controls the flow of water, and a TUNED LIGHT mixing system (("TLMS"), by Halliburton) value that controls the flow of a cement mixture. Further referring to FIG. 9, each control valve 905 has an inlet 910 and outlet 915. A controller 920 can open the valve 905 to a desired position (e.g., 0%, 25%, 95%). A flow meter 925 (shown in the inlet but which could be in the outlet 915) determines the amount of material flow through the valve 905. Information signals pathways 930 allow for exchange of information and control commands with, e.g., programmable logic control (PLC) computer 390.

Referring now again to FIG. 3, the power source 320 can include one or more electric or gas powered motors which are directly or indirectly coupled to, various components of the cementing system 301 via a drive shaft 325 which translates power from the power source 320 to the various components. The fluid mixing system 330 can have a water tank (not shown), for storage of water and/or other fluids, and mixing tank (not shown) in which water, fluids, dry cementing mix and other materials can be mixed to form the cement slurry or fluid composition. The fluid composition can be homogeneous or heterogeneous and be in the form of a fluid, slurry, dispersion, suspension, mixture or other similar compositional state wherein the components of the mixture or composition can be combined at varying ratios. The fluid composition can be drilling mud, fresh water, sea water, or base oil. The fluid mixing system 330 can be coupled to the PLC computer 390 to monitor the amount of water or other materials therein, to control the rate of mixing in the mixing tank, test the functioning of the fluid mixing system, and perform other functions related to the fluid mixing system 330.

Liquid additives stored in storage vessels (not shown) can be added to the mixing tank via one or more of the plurality of liquid additive pumps 340. Each liquid additive pump 340 can be coupled to a corresponding storage vessel containing a distinct additive. The output flow of the liquid additives from the liquid additive pumps 340 can be monitored by the plurality of flow meters 350, wherein each liquid additive pump 340 is coupled to a corresponding flow meter 350. Each flow meter 350 is coupled a corresponding one of the plurality of data transmitters 360. The plurality of data transmitters are coupled to the PLC computer 390 and transmit flow output data from the flow meters 350 to the PLC computer 390. The PLC computer 390 can control and monitor the rate of additive addition to the mixing tank, test the functioning of the liquid additive pumps 340, and perform other functions related to the movement of the liquid additives.

The high pressure fluid pump system 370 includes a high pressure pump 372. The power source 320 actuates the high pressure pump 372. The slurry containing one or more of water, cement mix, additives, or other fluids is sent to the high pressure pump 372 from the mixing tank. The high pressure pump 372 is coupled to the high pressure discharge manifold 380 and pumps the fluid at a predetermined pressure to the high pressure discharge manifold 380. The high pressure discharge manifold 380 is coupled to a rig line of the oil rig (not shown) for injection into the wellbore. The high pressure fluid pump system 370 can be directly or indirectly coupled to the PLC computer 390. The fluid output pressure of the high pressure pump 372 can be altered manually or through the PLC computer 390. The functioning of the high pressure fluid pump system 370 can also be monitored and tested by the PLC computer 390.

The PLC computer 390 can include one or more graphical user interfaces (GUIs) 392 for monitoring, controlling, or quality testing the functions of the individual components of the cementing system 1 described above. Each GUI 392 can display one or more monitoring and controlling options of a single component or multiple components of the cementing system 1.

Figure 4:
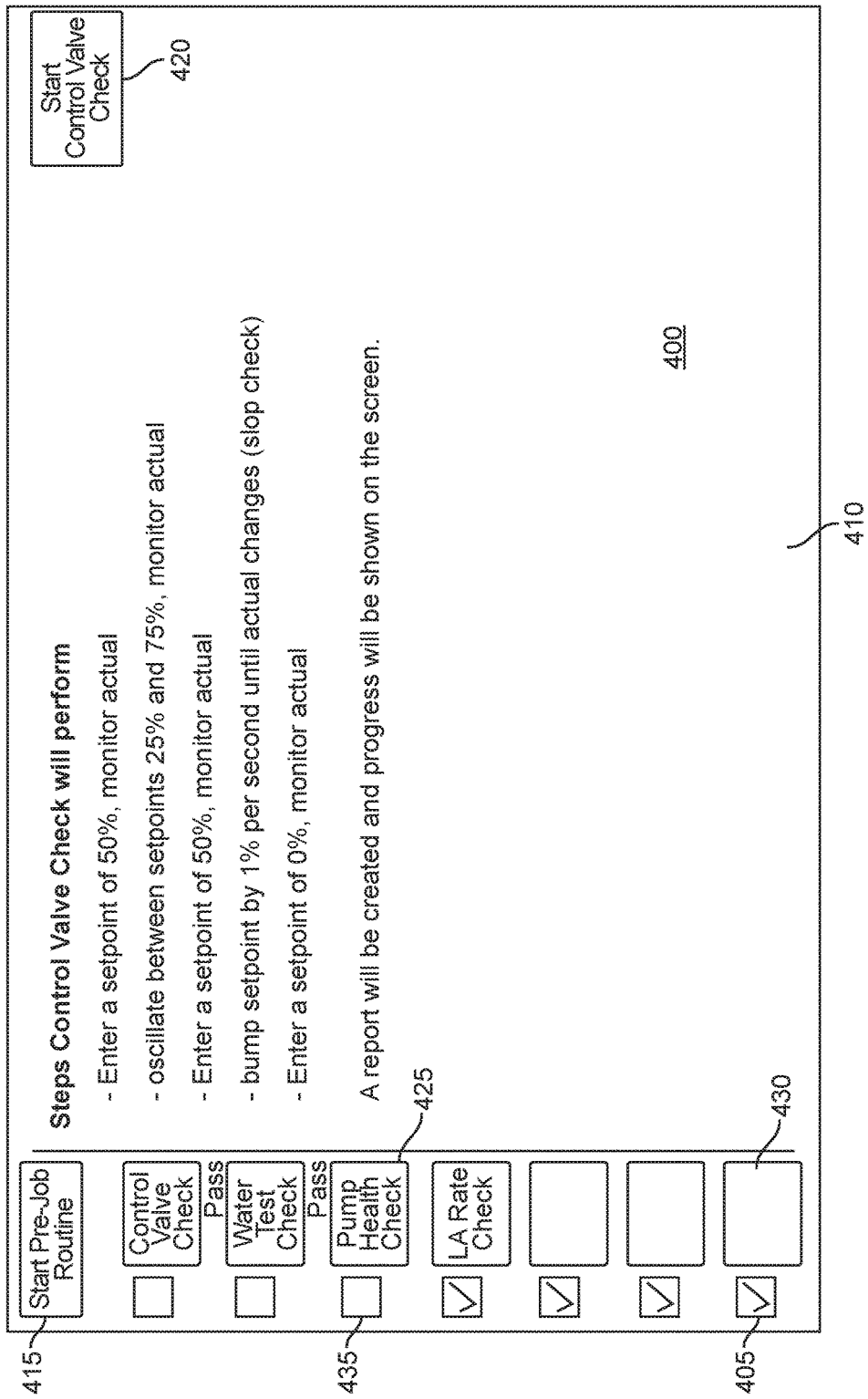
FIG. 4 is a non-limiting example of an embodiment of an interface screen for display of test information to run diagnostics on a cementing system.

Referring now to FIG. 4, an interface screen 400 for establishing and implementing test parameters for the cementing system 301 is shown as a non-limiting example of a GUI 392. Interface screen 400 may be displayed on PLC computer 390, or other computer as may be connected to or in communication with cementing system 301.

The interface screen 400 generally is separated into a list zone 405 and a details zone 410. At least two process activation buttons are also provided, including a global activate button 415 and a local activate button 420.

The list zone includes a column of information buttons 425 populated with the names of different diagnostic tests that may be included in a global diagnostic test routine. Preferably the information buttons 425 are in, and represent, descending order of priority for the tests. By way of non-limiting example, the descending order may represent the sequence of individual tests that will be conducted as part of the global test. In FIG. 4, the sequence of tests, as shown by the descending order of information buttons 425, is a control valve check test, a water check test, the pump health check test, and the liquid ingredient ("LA") test. Unpopulated buttons 430 within information buttons 425 may represent reserved information buttons (no assigned function) or are directed to other tests not specifically discussed herein; such unpopulated buttons 430 may also be omitted. The buttons 425 may be fixed, or moveable/rearrangeable though, e.g., drag and drop methodologies.

In response to pressing any of the information buttons 425, the system will display information about the selected test in detail zone 410. Preferably the information will include the specific substeps for the test, but the information does not necessarily include or exclude the same. FIG. 4 shows a non-limiting example of the displayed response for pressing the control valve check test button ("pressing" or "depression" of a button referring to the concept of selecting the button for use, typically by keyboard, mouse or touch screen, although the present disclosure is not limited to any particular way in which the test represented by the button is selected). This particular test has five substeps, including: (a) establish set percentage of valve opening ("setpoint") to 50% and monitor actual deployment, (b) oscillate the set points between 25% and 50% and monitor actual deployment, (c) return to a setpoint of 50% and monitor actual deployed, (d) increase the setpoint by 1% per second and monitor until actual deployment adjusts (slope check), and establish a set point of 0% (fully closed) and monitor actual deployment. The substeps of the test are listed in the details zone 410. (As used herein, "substeps" includes one or more steps.)

The particular control valve test in FIG. 4 is static, in that the test is standardized and does not allow for customization; there are accordingly no fields presented or accessible that would allow a local change or override of the test. However, the present disclosure (and the check valve test) is not so limited. Customizable options (such as discussed below with respect to FIG. 10) may be available.

Pressing a particular information button 425 may also customize the local activate button 420 and/or other aspects of screen 400 to display in a manner specific to the selected information button 425. In FIG. 4, the system responded to the selection of the control valve check button by customizing the local activate button 420 to the selected test as "start check valve test." However, the present disclosure is not so limited, and other customized methods could be used. By way of non-limiting example, customized information could be displayed proximate to a generic button. In another non-limiting example, there could be a list of local activation buttons 420 similar to information buttons 425 for which preferably only the button specific to the selected test displayed in details area 410 is useable (the rest being greyed out, or simply not responsive to depression). In yet another alternative, there may be no customization at all.

Each information button 425 preferably has a corresponding selection choice area where the user can flag/select the corresponding test for inclusion in the global diagnostic test routine. In FIG. 4, the selection choice area is a selection field 435 as a check box that the user can check to select the test or leave empty to omit the test. However, the present disclosure is not limited to the particular architecture of the selection choice area, and other interface methodologies could be used to indicate inclusion or exclusion from the global diagnostic test routine. By way of non-limiting example, separate buttons consistent with "yes" or "no" could be used.

Figure 5:
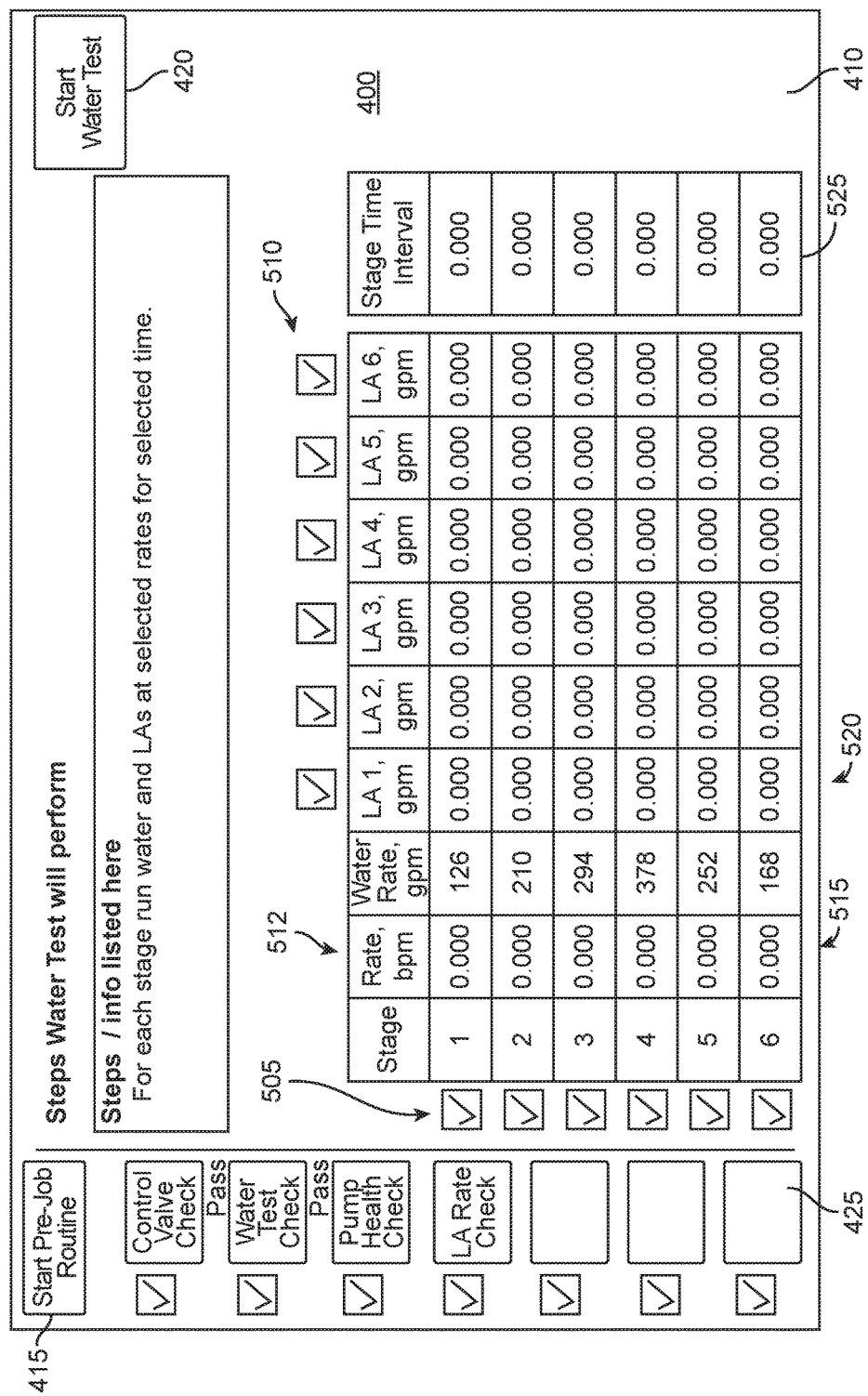
FIG. 5 is a non-limiting example of an embodiment of an interface screen for display of test information to run diagnostics on a cementing system.

Referring now to FIG. 5, the interface screen 400 is shown in a state responsive to the water test button. The water test checks for whether a certain combination of water and liquid additives will flow at a prescribed rate. The displayed information in details zone 410 will include the specific substeps for that test.

In the embodiment of FIG. 5, the water test displayed in details zone 410 has customizable elements. The first customizable element is the number of different combinations to test ("stages"). Stages 1-6 are shown in FIG. 5 to allow for up to six different combinations, although the present disclosure is not so limited. The user selects the number of stages for the diagnostic by selecting a corresponding selection field 505 corresponding to the desired stage number. All selection fields 505 are checked in FIG. 5, and as such all six stages have been selected for testing. However, the present disclosure is not so limited, and other methods for selecting the number of stages may be used. By way of non-limiting example, a field may be provided with a selection/entry of specific number of stages, and interface screen 400 only displays the selected/entered number of stages. However, less than all can be checked/selected, and only those stages and/or liquid additives will be tested.

Another customizable component in FIG. 5 is the selection of which liquid components to combine. As noted above, cement system 301 includes a plurality of liquid additive pumps 340 connected to separate liquid additive reservoirs, each of which appears as an additive selectable via selection field 510. Six liquid additives LA 1-6 are shown in FIG. 5, although the present disclosure is not limited to six. All selection fields 510 are checked in FIG. 5, and as such all six LA will be combined in some quantity. However, the present disclosure is not so limited, and other methods for selecting the liquid additives may be used. By way of non-limiting example, a field may be provided with a selection/entry of specific liquid additives, and interface screen 400 only displays the selected/entered ones. However, less than all can be checked/selected, and only those stages and/or liquid additives will be tested.

Once a column or row is selected for customization, the various entries of the grid can be populated (FIG. 5 shows the fields unpopulated at zero) to set the parameters of the test combination, including the water rate, rate of liquid additives, and the time interval. Column 515 is populated by the desired water flow rate, preferably in barrels per minutes; the column 512 to the right shows default values of water flow in gallons per minute for reference, but could change to match content entered into column 515. Columns 520 (for each additive) can be populated by gallons per minute for the particular liquid additive, and stage time interval (which represents the length of the test) can be populated with a time in column 525.

Figure 6:
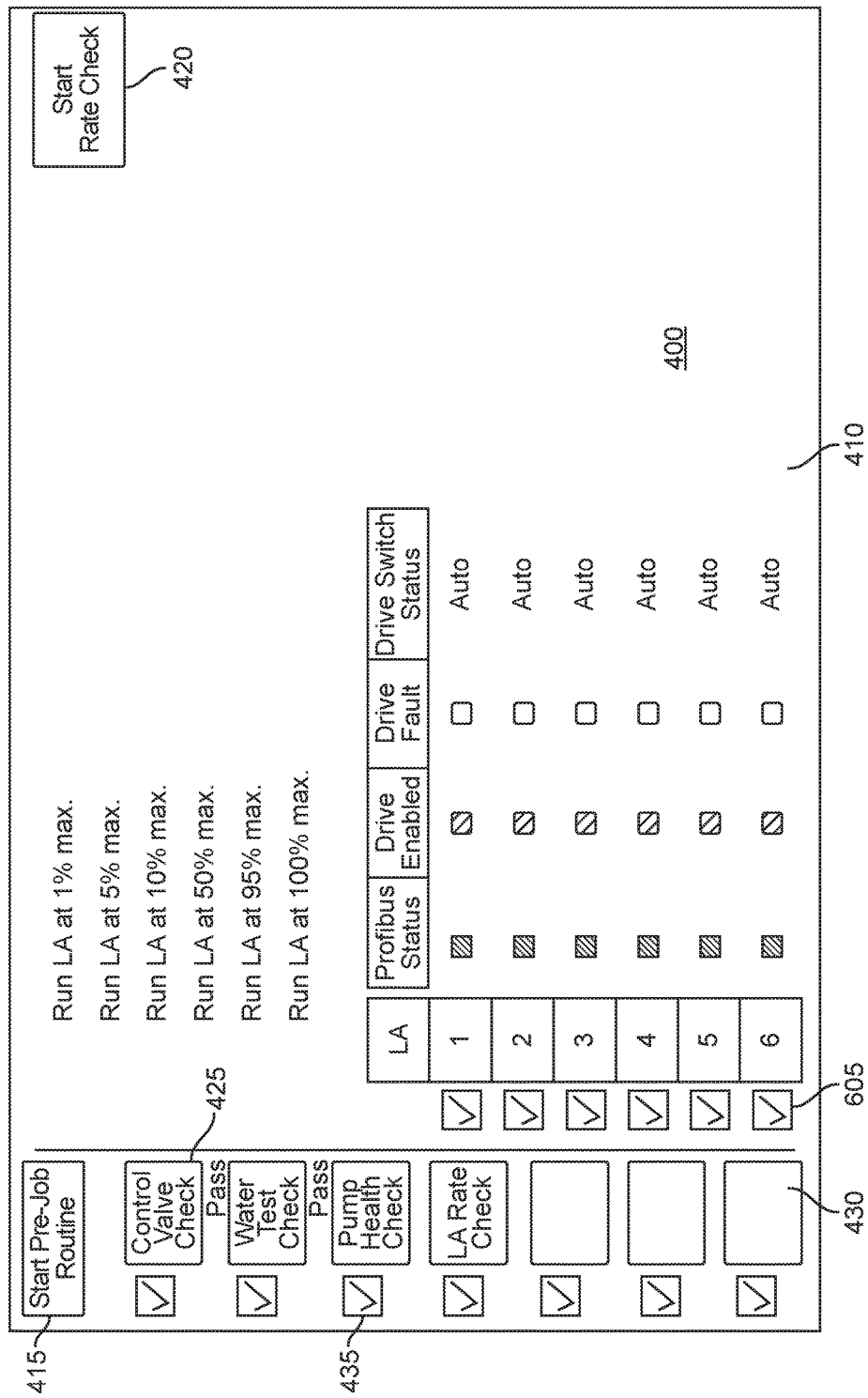
FIG. 6 is a non-limiting example of an embodiment of an interface screen for display of test information to run diagnostics on a cementing system.

Referring now to FIG. 6, the interface screen 400 is shown in a state responsive to pressing the liquid additive rate test button. The displayed information as before will include in details zone 410 the specific substeps for that test. The test includes running the pumps at intervals of a certain percentage of maximum flow rate, beginning at 1% and ending at 100%. The LA rate test checks for flow of material through liquid additive pumps 340. Flow meters 350 monitor the actual flow rate and report the data back through the data transmitters 360.

In this embodiment the liquid additive rate test has customizable elements, in particular the selection of which LAs to test as selectable by selection fields 605. Six liquid additives LA 1-6 are shown in FIG. 6, although the present disclosure is not limited to six. All selection fields 605 are checked in FIG. 6, and as such all six liquid additive pumps 340 will be tested. However, the present disclosure is not so limited, and other methods for selecting the number of pumps 340 may be used. By way of non-limiting example, a field may be provided with a selection/entry of specific pumps 340, and interface screen 400 only displays the selected/entered number of pumps. In another non-limiting example, the liquid additive rate test may not be customizable, and all liquid additive pumps 340 are tested.

In the embodiment of FIG. 6, the percentages of pressure run, the % increments, and the timing of each increment is preset, and thus not customizable or modifiable on interface screen 400. However, the present disclosure is not so limited, and additional fields may be provided to adjust any of these parameters.

In some embodiments with normally customizable selections, various components that normally may be tested may be unavailable, e.g., damaged or otherwise offline. This may be indicated by, e.g., the components themselves to the extent that they have electronic communication with the system, sensors associated with the components, manual status entries into the system or hardwiring into software. To the extent that tests for such components are normally selectable, the selection option could be greyed out or otherwise unresponsive to depression.

Referring now to FIGS. 4-6, interface screen 400 provides at least two options (although the present disclosure is not so limited) for commencing diagnostic testing, via global activate button 415 and local activate button 420. Depression/selection of local activate button 420 will commence the specific test that is currently displayed in details zone 410 (via prior selection of the appropriate information button 425). By way of non-limiting example, in FIG. 4 detail zone 410 is populated with the control valve check substeps, and that test would be commenced via selection of local activate button 420. By way of another non-limiting example, in FIG. 5, detail zone 410 is populated with the water test check substeps, and that test is commenced via selection of local activate button 420.

While locate activate button 425 commences the single displayed test, global activate button 415 commences all of the tests listed in information buttons 425 that are selected, such as via selection field 435. By way of non-limiting example, in FIG. 4 only "LA rate check" information button 425 has its corresponding selection field 435 checked; note other check selection fields for blank buttons 430 do not having any specific test. Pressing/section of global activate button 415 with the selections in FIG. 4 will thus commence the LA rate check test as the only selected test of the global diagnostic test routine.

By way of another non-limiting example, in FIG. 5, all four (4) of the information buttons 425 are selected. Pressing/section of global activate button 415 will thus commence each test in the sequence shown by the descending order of the information buttons.

Figure 7:
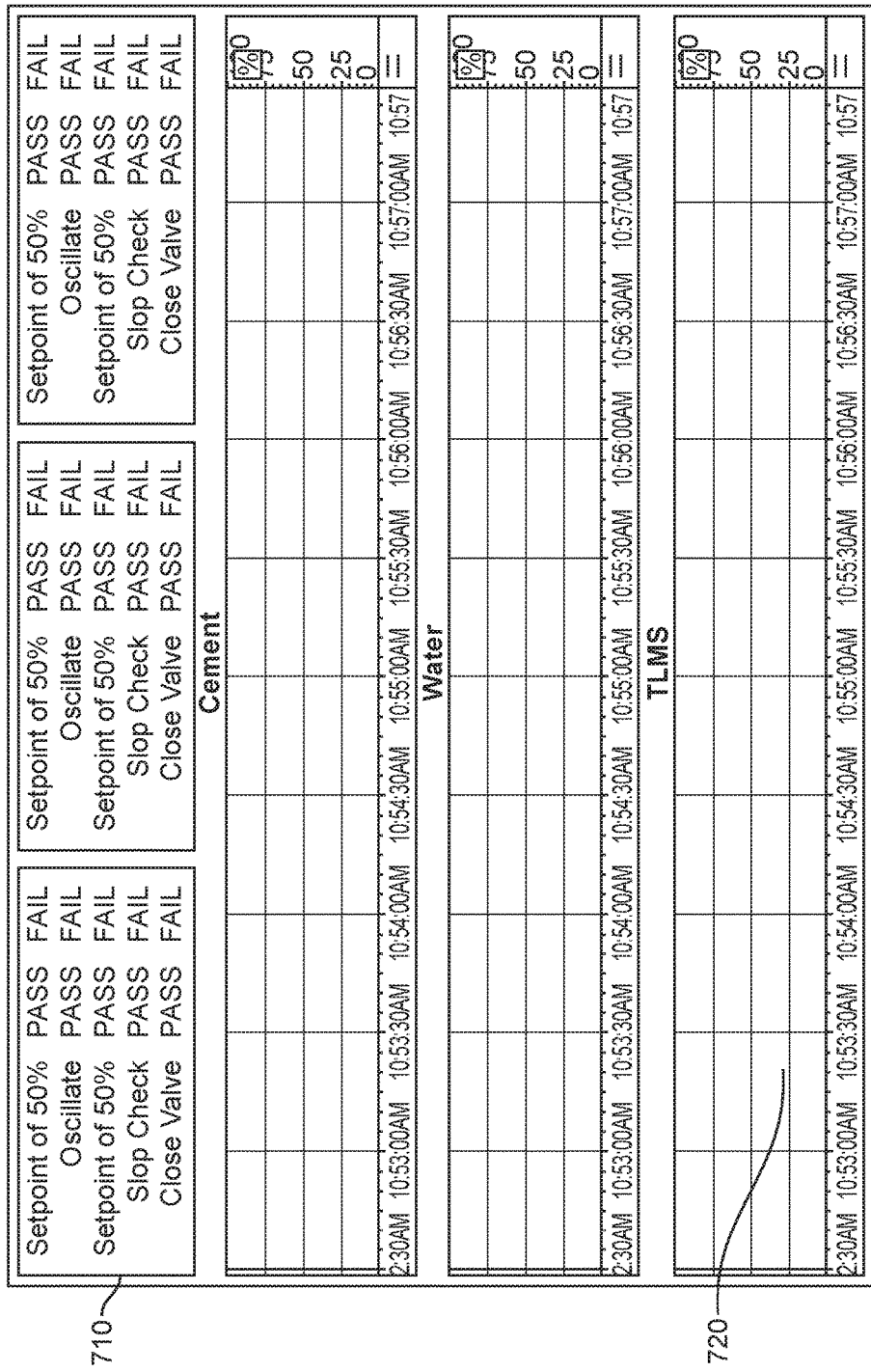
FIG. 7 is a non-limiting example of an embodiment of an output display of test information in near real time of a diagnostic test on a cementing system.

Once testing commences, the system switches from display of interface screen 400 (which is input centric) to a status screen that displays progress of the diagnostics in near real time. Referring now to FIG. 7, a status screen 700 tracks the progress of the control valve check test for three control valves: cement, water and TLMS mixing. Status screen includes a results zone 710 and a data zone 720. Results zone 710 displays the individual substeps of the test, noting whether the specific step passed or failed, although the present disclosure is not so limited and numerical summary data may be provided. Data zone 720 displays the raw data, such as the percentage that the value is open at a particular time; the raw data will show in the case of a failure how far off of the actual measured parameter is from the target parameter, which may assist in isolating the nature and extent of the problem that is behind the failure. FIG. 7 shows display screen 700 in an unpopulated state (i.e., just before the test is run).

Figure 8:
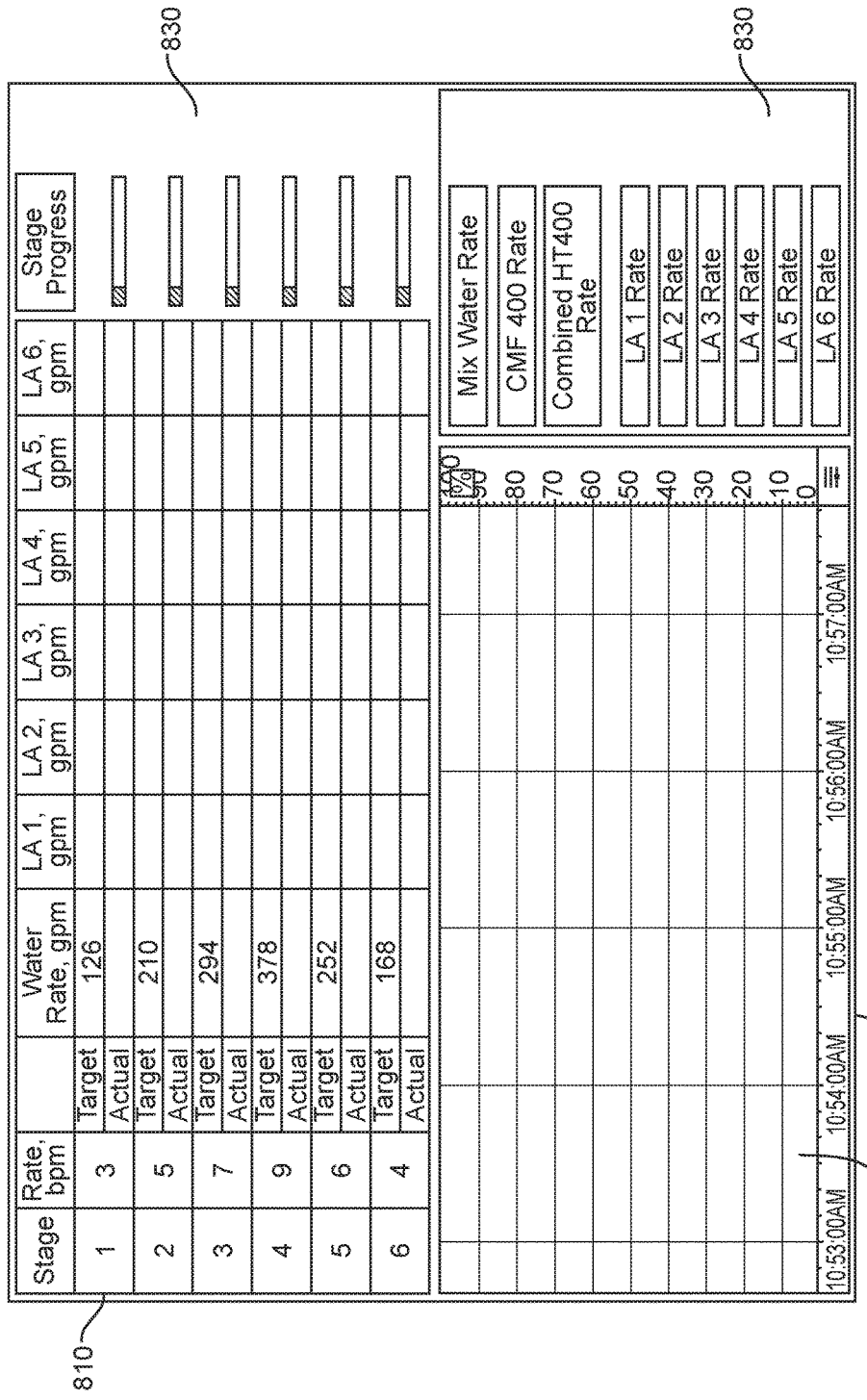
FIG. 8 is a non-limiting example of an embodiment of an output display of test information in near real time of a diagnostic test on a cementing system.

FIG. 8 is a non-limiting example of a status screen 800 that tracks the progress of the water test. Status screen 800 includes a results zone 810 and a data zone 820 (both unpopulated, and thus representing the status screen 800 just before test data arrives). Results zone 810 provides summary data of the tests relative to the target values, but the present disclosure is not so limited and the summary data could simply be a pass/fail indicator. Results zone 810 may also include a progress bar 830, which indicates the progress of the particular test; this may be particularly useful for tests that have time components (customizable or not), but the present disclosure is not so limited.

Data zone 820 displays the raw data for the actual percentage of flow from the water and liquid additives over time, as well as any related test parameters (e.g., CMF400 and HT400 rate, which reflect certain peripheral water flow rates). Preferably the components of the raw data are visually discernable (e.g., color coded), for which a legend area 830 may be provided. Legend area 830 may be informational only, or the various entries may also be buttons that isolate or highlight the raw data in data zone 810 for that legend entry.

Figure 10:
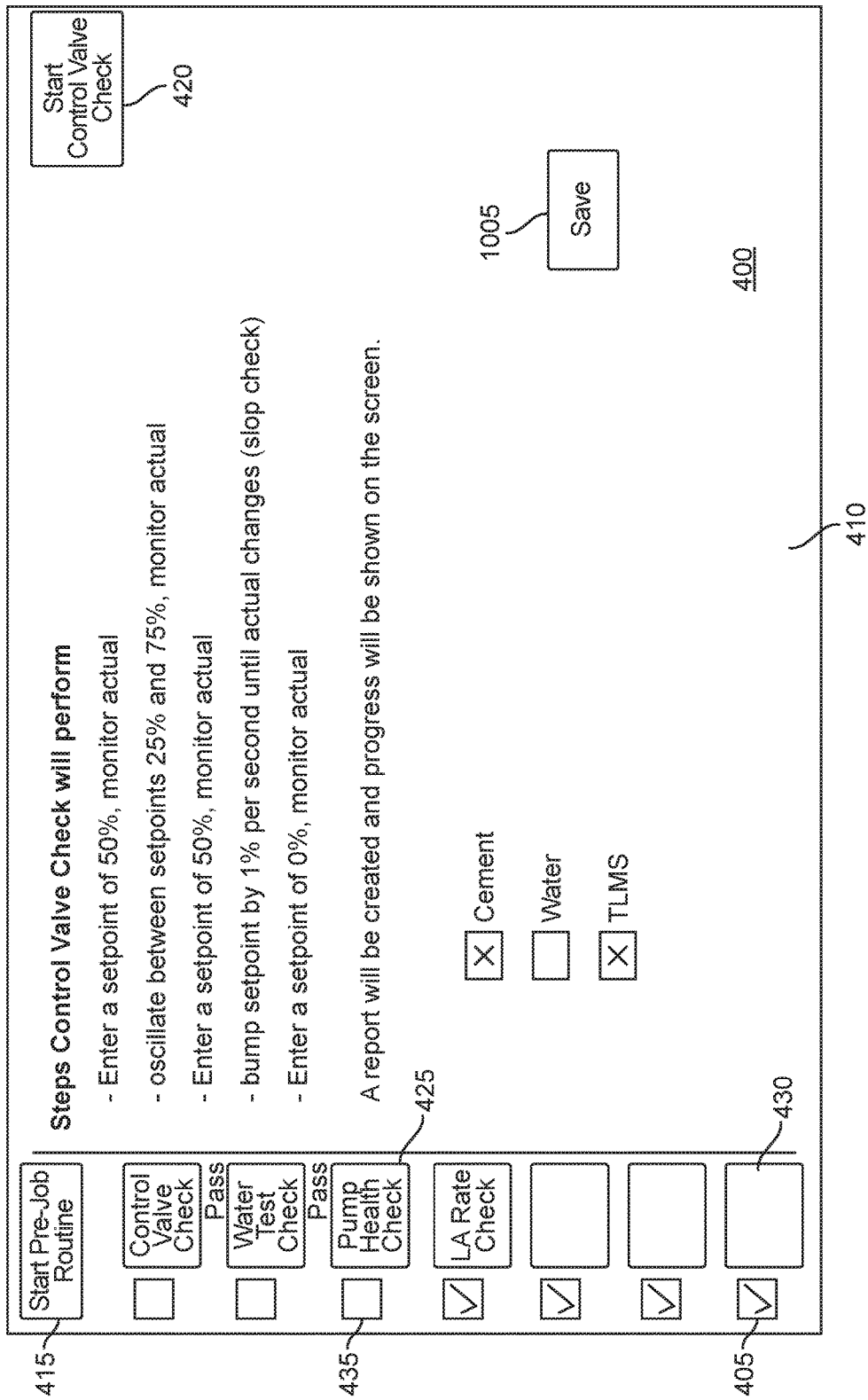
FIG. 10 is a non-limiting example of an embodiment of an interface screen for display of test information to run diagnostics on a cementing system.

The various screens discussed herein are exemplary only. Screens for other tests may be created consistent with the teachings herein, adopting features from all or part of the different screens, mixing and matching concepts as appropriate, and potentially adding or modifying displayed content as needed. Similarly, the screens for the tests herein are exemplary only, and could mix and match concepts as appropriate, and potentially add or modify displayed content as needed. By way of non-limiting example, FIG. 10 shows another embodiment of interface screen 400 for the control valve test. In this embodiment, the individual control valves are displayed in detail zone 410 and can be selected for or omitted from testing as discussed herein.

FIG. 10 also illustrates that the interface screen 400 may include a save button 1005, which can save a particular selection of tests and substeps for completion at a later time, or to run a completed selection at a later time.

Various diagnostic tests herein involve pass/fail. This may refer in its strictest sense to an absolute match between a desired parameter and its actual implementation. Preferably, however, there is some pre-set permissible degree of variance between a desired parameter and its actual implementation within which the tested component would be considered to pass. This permissible degree may be a fixed component of the test, or customizable.

Various embodiments herein are directed to the control and diagnostic testing of a cement slurry or fluid composition dispenser. However, the present disclosure is not so limited, and the nature of the various interface screens and display screens could be applied to diagnostic testing of other devices that have physical elements.

Figure 11:
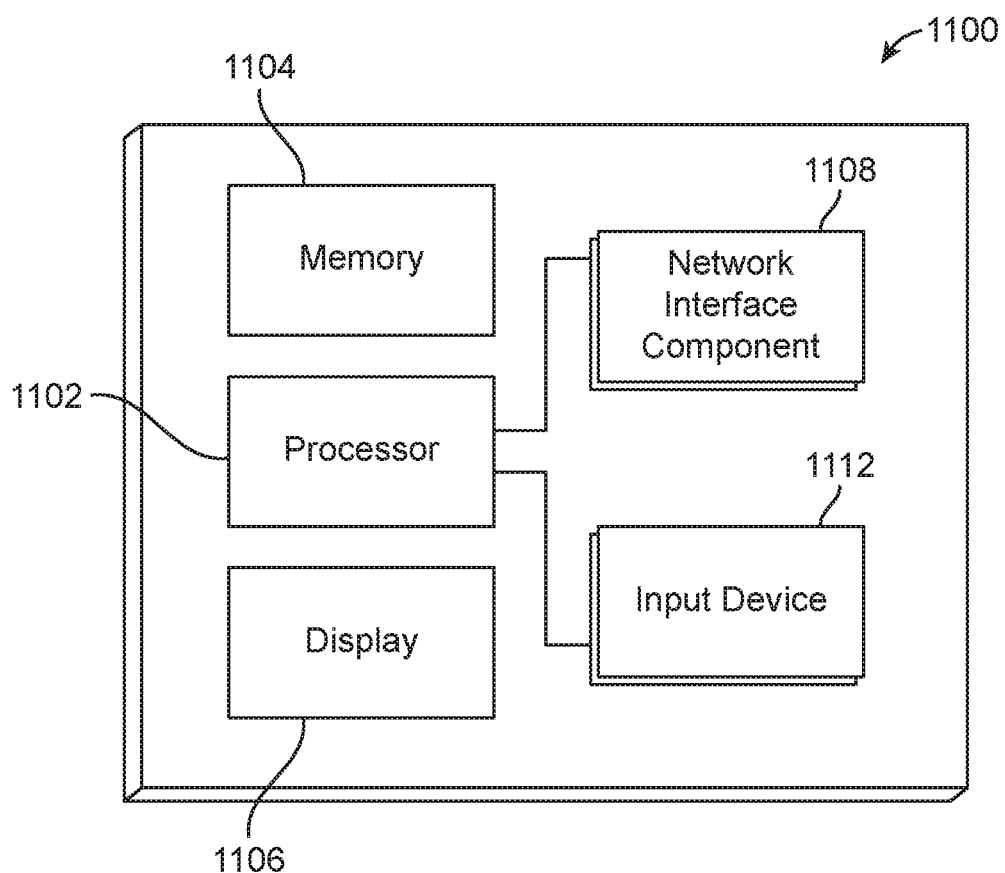
FIG. 11 illustrates a logical arrangement of a set of general components of an example computing device that can be utilized in accordance with various embodiments.

Referring to FIG. 11, a block diagram of a computing device in accordance with an exemplary embodiment is illustrated. The computing device 1100 can be the programmable logic controller (PLC) 390 described above. A PLC can be an industrial computer control system that continuously monitors the state of input devices and makes decision based upon a program to control the state of one or more output devices (e.g., the GUIs 392 on the display screen 400). As such the PLC is a dedicated computing device. In one or more embodiments, the computing device 1100 can be a computer. In this example, the computing device 1100 includes a processor or central processing unit (CPU) 1102 for executing instructions that can be stored in a memory 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display 706, such as a touch screen or liquid crystal display (LCD), although devices such as portable media players might convey information via other means, such as through audio speakers. The display 1106 can be part of the computing device 1100 as shown. The computing device 1100 in one or more embodiments can include at least one input device 1112 able to receive conventional input from a user. This conventional input can include, for example, a push button, touch pad, touch screen, keyboard, mouse, keypad, or any other such device or element whereby a user can input a command to the device. In one or more embodiments, the computing device 1100 of FIG. can include one or more network interface components 1108 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

As used herein and above, "cement" or "cement composition" is any kind of material capable of being pumped to flow to a desired location, and capable of setting into a solid mass at the desired location. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, lost circulation materials, thixotropic agents, suspension aids, or combinations thereof.

The cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Statements of the Disclosure Include:

Statement 1: A cementing system, comprising: a cement slurry dispenser, including at least one control valve, at least one liquid additive pump, and at least one water pump; a computer having a display being configured to display an interface screen, the interface screen comprising a list zone of available selectable tests for the cement slurry dispenser and corresponding global selection choices, a detail zone, wherein in response to selection of one of the selectable tests from the list zone, substeps of the selected one of the selectable tests is displayed, a local activate button configured to commence only the selected one of the selectable tests displayed in the detail zone, and a global activate button configured to commence all of the selectable tests in the list zone that are indicated as selected by the corresponding global selection choices; wherein the computer, in response to engagement of the local activate button controls the cement slurry mixer to commence the selected one of the selectable tests displayed in the detail zone; and wherein the computer, in response to engagement of the global activate button controls the cement slurry mixer to commence all of the selectable tests in the list zone that are indicated as selected by the corresponding global selection choices.

Statement 2: The cementing system as in Statement 1, further comprising the computer being configured to, in response to activation of the local activate button or the global activate button, change its display from the interface screen to a status screen, the status screen including a results zone to indicate summary data representing whether substeps within a particular test passed or failed, and a data zone to show raw test data.

Statement 3: The cementing system as in Statement 1 or 2, wherein in response to engagement of the global activate button the computer is configured to control the cement slurry mixer to commence all of the selectable tests in the list zone that are indicated as selected by the corresponding global selection choices in the order as shown in the list zone.

Statement 4: The cementing system according to any of the preceding Statements 1 to 3, wherein the substeps include one or more steps.

Statement 5: The cementing system according to any of the preceding Statements 1 to 4, wherein the detail zone includes display of one or more customizable options for at least some of the substeps of the selected one of the selectable tests.

Statement 6: The cementing system according to any of the preceding Statements 1 to 5, wherein one of the available tests is a control valve test that tests the at least one control valve for its ability to open and close to present settings.

Statement 7: The cementing system according to any of the preceding Statements 1 to 6, wherein one of the available tests is a water flow test that tests the ability of the cement slurry to generate a combination of water and the at least one liquid additive.

Statement 8: A method for controlling a cementing system, according to any of the preceding Statements 1 to 7, comprising: providing a cement slurry dispenser, including at least one control valve, at least one liquid additive pump, and at least one water pump; providing a computer having a display and a processor; displaying an interface screen on the display, the interface screen including a list zone of available selectable tests for the cement slurry dispenser and corresponding global selection choices, a detail zone, wherein in response to selection of one of the selectable tests from the list zone, substeps of the selected one of the selectable tests is displayed, a local activate button to commence only the selected one of the selectable tests displayed in the detail zone, and a global activate button to commence all of the selectable tests in the list zone that are indicated as selected by the corresponding global selection choices; controlling the cement slurry dispenser, in response to engagement of the local activate button, to commence the selected one of the selectable tests displayed in the detail zone; and controlling the cement slurry dispenser, in response to engagement of the global activate button, to commence all of the selectable tests in the list zone that are indicated as selected by the corresponding global selection choices.

Statement 9: The method as in Statement 8, further comprising changing, in response to activation of the local activate button or the global activate button, display from the interface screen to a status screen, the status screen including a results zone to indicate summary data representing whether substeps within a particular test passed or failed, and a data zone to show raw test data.

Statement 10: The method as in Statement 8 or 9, further comprising commencing, in response engagement of the global activate button, all of the selectable tests in the list zone that are indicated as selected by the corresponding global selection choices in the order as shown in the list zone.

Statement 11: The method according to any of the preceding Statements 8 to 10, wherein the substeps include one or more steps.

Statement 12: The method according to any of the preceding Statements 8 to 11, wherein the detail zone includes display of one or more customizable options for the substeps of the selected one of the selectable tests.

Statement 13: The method according to any of the preceding Statements 8 to 12, wherein one of the available tests is a control valve test that tests the at least one control valve for its ability to open and close to present settings.

Statement 14: The method according to any of the preceding Statements 8 to 13, wherein one of the available tests is a water flow test that tests the ability of the cement slurry to generate combinations of water and the at least one liquid additive.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A cementing system, comprising:
   a cement slurry dispenser, including at least one control valve, at least one liquid additive pump, and at least one water pump;
   a computer having a display being configured to display an interface screen, the interface screen comprising:
      a list zone of available selectable tests for the cement slurry dispenser and corresponding global selection choices;
      a detail zone, wherein in response to selection of one of the selectable tests from the list zone, substeps of the selected one of the selectable tests is displayed;
      a local activate button configured to commence only the selected one of the selectable tests displayed in the detail zone; and
      a global activate button configured to commence all of the selectable tests in the list zone that are indicated as selected by the corresponding global selection choices;
   wherein the computer, in response to engagement of the local activate button controls the cement slurry mixer to commence the selected one of the selectable tests displayed in the detail zone; and
   wherein the computer, in response to engagement of the global activate button controls the cement slurry mixer to commence all of the selectable tests in the list zone that are indicated as selected by the corresponding global selection choices.

2. The cementing system of claim 1, further comprising the computer being configured to, in response to activation of the local activate button or the global activate button, change its display from the interface screen to a status screen, the status screen including a results zone to indicate summary data representing whether substeps within a particular test passed or failed, and a data zone to show raw test data.

3. The cementing system of claim 1, wherein in response to engagement of the global activate button the computer is configured to control the cement slurry mixer to commence all of the selectable tests in the list zone that are indicated as selected by the corresponding global selection choices in the order as shown in the list zone.

4. The cementing system of claim 1, wherein the substeps include one or more steps.

5. The cementing system of claim 1, wherein the detail zone includes display of one or more customizable options for at least some of the substeps of the selected one of the selectable tests.

6. The cementing system of claim 1, wherein one of the available tests is a control valve test that tests the at least one control valve for its ability to open and close to present settings.

7. The cementing system of claim 1, wherein one of the available tests is a water flow test that tests the ability of the cement slurry to generate a combination of water and the at least one liquid additive.

8. A method for controlling a cementing system, comprising:
   providing a cement slurry dispenser, including at least one control valve, at least one liquid additive pump, and at least one water pump;
   providing a computer having a display and a processor;
   displaying an interface screen on the display, the interface screen including;
      a list zone of available selectable tests for the cement slurry dispenser and corresponding global selection choices;

a detail zone, wherein in response to selection of one of the selectable tests from the list zone, substeps of the selected one of the selectable tests is displayed;

a local activate button to commence only the selected one of the selectable tests displayed in the detail zone; and a global activate button to commence all of the selectable tests in the list zone that are indicated as selected by the corresponding global selection choices;

controlling the cement slurry dispenser, in response to engagement of the local activate button, to commence the selected one of the selectable tests displayed in the detail zone; and controlling the cement slurry dispenser, in response to engagement of the global activate button, to commence all of the selectable tests in the list zone that are indicated as selected by the corresponding global selection choices.

9. The method of claim 8, further comprising changing, in response to activation of the local activate button or the global activate button, display from the interface screen to a status screen, the status screen including a results zone to indicate summary data representing whether substeps within a particular test passed or failed, and a data zone to show raw test data.

10. The method of claim 8, further comprising commencing, in response engagement of the global activate button, all of the selectable tests in the list zone that are indicated as selected by the corresponding global selection choices in the order as shown in the list zone.

11. The method of claim 8, wherein the substeps include one or more steps.

12. The method of claim 8, wherein the detail zone includes display of one or more customizable options for the substeps of the selected one of the selectable tests.

13. The method of claim 8, wherein one of the available tests is a control valve test that tests the at least one control valve for its ability to open and close to present settings.

14. The method of claim 8, wherein one of the available tests is a water flow test that tests the ability of the cement slurry to generate combinations of water and the at least one liquid additive.

* * * * *